United States Patent Office 3,453,070
Patented July 1, 1969

3,453,070
PREPARATION OF WHITE CALCIUM
CYANAMIDE
Herwig Höger and Hermann Kronacher, Trostberg, Germany, assignors, to Suddeutsche Kalkstickstoff-Werke Aktiengesellschaft, and Fa. Dr. C. Otto & Co. G.m.b.H., Trostberg and Bochum, Germany
Filed July 29, 1965, Ser. No. 475,715
Int. Cl. C01c 3/18
U.S. Cl. 23—78
2 Claims

ABSTRACT OF THE DISCLOSURE

The heretofore rapid corrosion of reactor lining in the simultaneous preparation of lime containing small catalytic amounts of calcium chloride for the production of calcium cyanamide can be avoided by separation of the steps of the combustion of calcium carbonate to calcium oxide and the conversion of a small amount of calcium oxide to calcium chloride.

Figure 1:
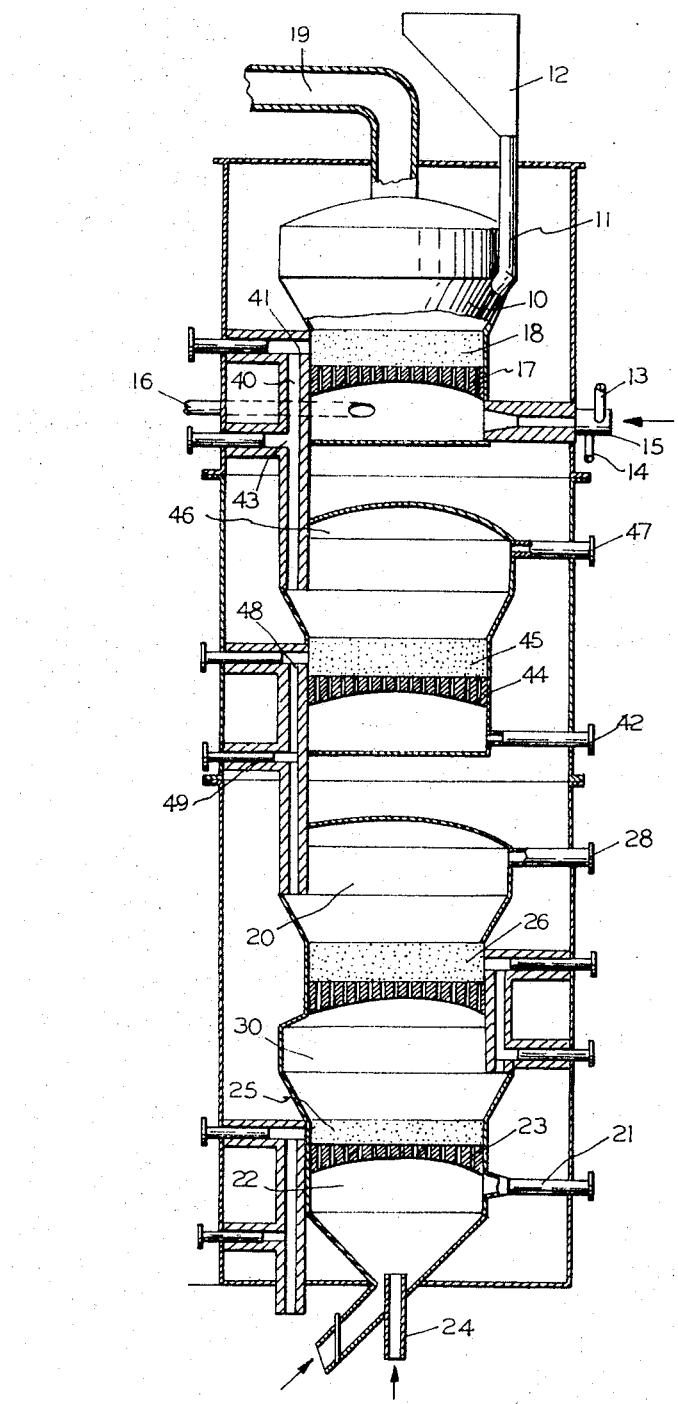

The invention relates to the preparation of white calcium cyanamide.

The term "white" calcium cyanamide is being used to designate calcium cyanamide which is substantially free of graphite; it is prepared by calcination of limestone and subsequent reaction of the calcined lime with nitrogen and carbon containing gases.

It is known to prepare such white calcium cyanamide in a turbulence zone by treating limestone, preferably in a single step, with solid, liquid, or gaseous fuel, and air in an amount sufficient for the combustion of the fuel, until the limestone is completely calcined. The combustion gases are continuously drawn off in the hot state, and the calcined lime is, also in the hot state, immediately passed into a second turbulence zone, which is gas-tight sealed from the calcination zone. In said second zone, the lime is reacted with nitrogen and carbon containing gases. Suitable gases are ammonia-carbon monoxide mixtures, or also hydrogen cyanide. In order to increase the rate of nitrogenation, gaseous hydrogen chloride was added to the air for the fuel combustion towards the end of the calcination step, so as to obtain a lime containing about 0.1 to 1.5 percent by weight of chlorine.

In continuous operation of such a plant, it was found that, in presence of hydrogen chloride, the ceramic lining of the combustion zone was rather quickly destroyed, and it was considered more economic to operate without hydrogen chloride and to be satisfied with a somewhat slower reaction rate in the nitrogenation zone.

It is the object of this invention to provide a process for the preparation of white calcium cyanamide directly from limestone where the advantages of the addition of hydrogen chloride are maintained without shortening the life of the furnace.

When investigating the chemical mechanism responsible for the destruction of the refractory walls of the furnace, we found that, though neither CaO nor $CaCl_2$ attack the lining, it is the molten mixture of the two components forming in the combustion chamber which at the temperatures obtaining in said chamber reacts with the walls.

According to the invention, the HCl treatment of the lime is no longer carried out in the calcination zone but in a subsequent separate turbulence zone at a temperature of 500 to 850° C. from which zone the thus treated calcium oxide is then transferred at said temperature into the turbulence zone where the nitrogenation reaction takes place.

At the end of the calcination process in the first turbulence zone, the temperature rises somewhat so that the lime discharged into the chlorination zone will have generally a temperature of about 800 to 850° C. without requiring additional heat supply. The temperature in said zone should not drop below 500° C., preferably not lower than 600° C.

In the subsequent turbulence zone for the nitrogenation reaction, the reaction temperature is maintained by preheated reaction gases.

A long as the temperature of the lime in the chlorination turbulence zone is maintained in the range of 500 to 850° C., it does not matter whether such zone is within the reactior or is provided by a suitable intermediate vessel.

While a reactor operated with addition of hydrogen chloride as disclosed, e.g. in German Patent No. 1,024,494, had at best a life of about 3 months, the lining of a reactor operated according to our invention showed no harmful deterioration after continuous operation for 6 months.

A further advantage of a separate chlorination turbulence zone according to our invention consists in the elimination of any risk of air from the combustion zone to the combustible gases of the nitrogenation zone, even if some of the valves would no longer close hermetically.

It is of advantage to sweep the chlorination zone, during or after chlorination of the lime, with an inert noncombustible and oxygen-free gas such as nitrogen or combustion gases free of $CO_2$ in order to ensure that no explosive gas mixtures can form during transfer of the lime into the nitrogenation zone.

Apparatus suitable for carrying out our method is shown, by way of example, in the accompanying drawings wherein—

Figure 2:
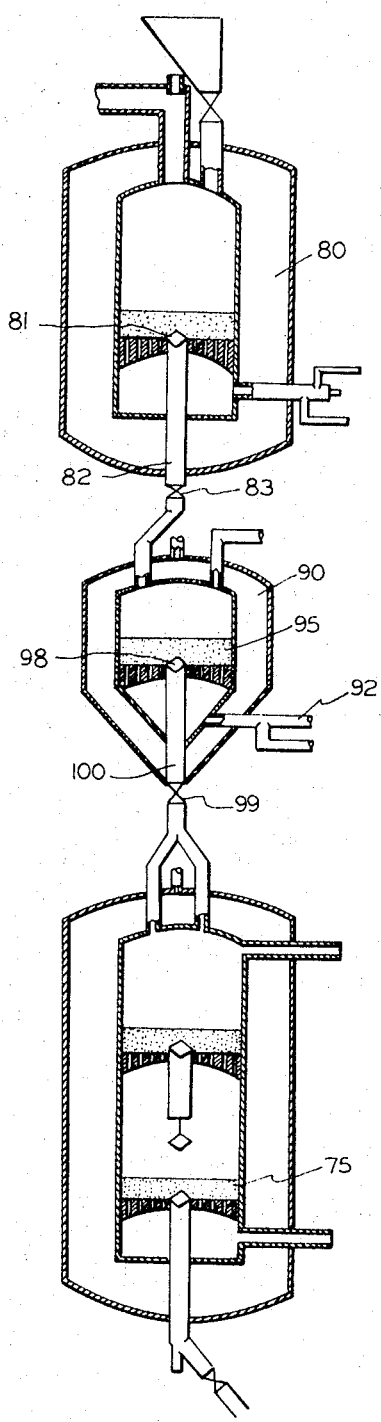

FIG. 1 is an elevational view of a combined calcination and nitrogenation turbulence reactor, and FIG. 2 is a similar view of a reactor comprising separate calcination, hydrochlorination, and nitrogenation zones.

The reactor shown in FIG. 1 is similar to the reactor shown in German Patent No. 1,024,494 but consists of four superposed turbulence chambers, each comprising a support for the bed of the material and above said support first a conically upwardly flaring and then a cylindrical reaction zone. The calcination chamber 10 is provided with an admission pipe 11 through which limestone is introduced from the feed hopper 12. The heating gas enters through line 13 and the primary air through lines 14 into the burner 15; secondary air is introduced through lines 16 into the space below the turbulence bed support 17. The turbulence layer is designated by the numeral 18. The combustion gases leave through line 19.

The lime burnt in the calcination zone 18 is discharged through a downpipe 40 into the chamber 46 into which air or better inert gas is introduced through line 42 and distributing grid 44 during the lime transfer or immediately after the transfer is completed. After the valves or stoppers 41 and 43 for the downpipe have been closed, hydrogen chloride is admixed with the gas introduced through line 42 which gas keeps the lime in zone 45 in turbulent motion and imparts thereto a uniform content of $CaCl_2$. The gases leave said zone through line 47. The thus treated lime which contains about 0.1 to 1.5 percent by weight of chlorine, is then swept free of air by means of an inert gas, such as nitrogen; then, the gas outlet line 47 is closed, the valves 48 and 49 are opened one after the other, and the lime is discharged into the first nitrogenation zone 20 where it forms the turbulence layer 26.

The nitrogenation reactor comprises two chambers 20 and 30. Carbon monoxide enters through line 21 into the downwardly tapering chamber 22, which is situated below the bottom 23 of chamber 30. Ammonia is introduced through the center pipe 24. The turbulence layer in the chamber 30 is designated by the reference numeral 25, and the layer in the chamber 20 by the numeral 26. The gases pass from the chamber 30 upwardly into the chamber 20 and leave through the line 28.

In the modification shown in FIG. 2, the reaction zones are separated from each other and provided in separate reaction vessels which are connected with each other only through down pipes 82 and 100, respectively, provided with stoppers or valves. Lime calcined in the turbulence zone of the calcination furnace 80 is discharged through line 82, after opening of cone valve 81 and valve 83, into the chlorination vessel 90 where it is treated in the turbulence zone 95 with hydrogen chloride containing gas from line 92. After the chlorination is completed and the chlorinated line has been swept air-free by inert gas, the valves 98 and 99 are opened and the lime is transferred still hot into the two-stage nitrogenation reactor 75 where it is nitrogenated as set forth with respect to FIG. 1.

As gas for the chlorination zone, we prefer to employ air containing 0.5 to 10% by volume of HCl.

We claim:

1. A method of preparing white calcium cyanamide comprising passing limestone in counter-current to combustion gases of a fuel-air mixture into a calcination zone, heating the limestone in said reaction zone at calcination temperature, maintaining said limestone within said reaction zone in turbulent motion by said gases until the limestone has been substantially converted to lime, allowing said lime, while still having a temperature of at least 500° C. but not exceeding 850° C. to fall by gravity from said calcination zone into a chlorination zone, passing a gas containing hydrogen chloride through said chlorination zone for a time sufficient to impart to said lime a chlorine content of 0.1 to 1.5 percent by weight, maintaining said lime in said chlorination zone by means of said gas in turbulent motion, finally allowing the partially chlorinated lime to fall from said chlorination zone into a nitrogenation zone, passing a preheated nitrogenating gas selected from the group consisting of ammonia-carbon monoxide mixtures and hydrogen cyanide upwardly through said second reaction zone at a temperature of about 700–900° C., to maintain the lime within said nitrogenation zone in turbulent motion until it is substantially converted to $CaCN_2$, sealing said calcination zone against the gases of said chlorination zone and said chlorination zone against the gases of said nitrogenation zone, and withdrawing hot combustion gases from said calcination zone, and calcium cyanamide from said nitrogenation zone.

2. The method as claimed in claim 1 comprising passing an oxygen-free inert gas through said chlorination zone before the chlorinated lime is transferred into said nitrogenation zone whereby said chlorinated lime is swept free of air.

References Cited

UNITED STATES PATENTS

| | | | |
|---|---|---|---|
| 1,388,603 | 8/1921 | Reid | 23—78 |
| 2,161,328 | 6/1939 | Winter et al. | 23—78 |
| 2,940,824 | 6/1960 | Kaess et al. | 23—78 |

FOREIGN PATENTS

| | | |
|---|---|---|
| 1,024,494 | 2/1958 | Germany. |
| 364,225 | 1/1932 | Great Britain. |

OTHER REFERENCES

Handbook of Chemistry & Physics, Hodgman et al., 43rd edition, 1961, pp. 550, 551, 552, 553, published by The Chemical Rubber Publishing Co., Cleveland, Ohio.

OSCAR R. VERTIZ, *Primary Examiner.*

H. S. MILLER, *Assistant Examiner.*